United States Patent
Nagelsdiek et al.

(10) Patent No.: US 11,034,878 B2
(45) Date of Patent: Jun. 15, 2021

(54) EMULSION, METHOD FOR THE PRODUCTION THEREOF AND USE THEREOF

(71) Applicant: BYK-Chemie GmbH, Wesel (DE)

(72) Inventors: René Nagelsdiek, Wesel (DE); Sylvia Bühne, Wesel (DE); Jan von Haaren, Wesel (DE); Agnetha Klein, Wesel (DE); Christian Sauerländer, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 312 days.

(21) Appl. No.: 16/308,678

(22) PCT Filed: Jun. 2, 2017

(86) PCT No.: PCT/EP2017/063571
§ 371 (c)(1),
(2) Date: Dec. 10, 2018

(87) PCT Pub. No.: WO2017/211748
PCT Pub. Date: Dec. 14, 2017

(65) Prior Publication Data
US 2019/0153289 A1    May 23, 2019

(30) Foreign Application Priority Data

Jun. 10, 2016 (EP) ..................................... 16174049
Jun. 14, 2016 (EP) ..................................... 16174396

(51) Int. Cl.
| | |
|---|---|
| C09K 8/36 | (2006.01) |
| C11D 1/65 | (2006.01) |
| C11D 3/20 | (2006.01) |
| C11D 17/00 | (2006.01) |
| C09K 8/28 | (2006.01) |
| B01F 17/00 | (2006.01) |
| E21B 21/00 | (2006.01) |
| C11D 3/04 | (2006.01) |
| C11D 3/43 | (2006.01) |
| C11D 1/06 | (2006.01) |
| C11D 1/34 | (2006.01) |
| C11D 1/52 | (2006.01) |

(52) U.S. Cl.
CPC .............. *C09K 8/36* (2013.01); *B01F 17/005* (2013.01); *B01F 17/0014* (2013.01); *B01F 17/0042* (2013.01); *B01F 17/0085* (2013.01); *C09K 8/28* (2013.01); *C11D 1/652* (2013.01); *C11D 3/046* (2013.01); *C11D 3/2075* (2013.01); *C11D 3/43* (2013.01); *C11D 17/0017* (2013.01); *E21B 21/00* (2013.01); *C09K 2208/14* (2013.01); *C11D 1/06* (2013.01); *C11D 1/342* (2013.01); *C11D 1/345* (2013.01); *C11D 1/52* (2013.01); *C11D 1/528* (2013.01)

(58) Field of Classification Search
None
See application file for complete search history.

(56) References Cited

U.S. PATENT DOCUMENTS

| | | |
|---|---|---|
| 2,946,746 A | 7/1960 | Keller, Jr. |
| 3,041,275 A | 6/1962 | Lummus et al. |
| 3,169,113 A | 2/1965 | Kirkpatrick et al. |
| 3,259,572 A | 7/1966 | Dickson et al. |

(Continued)

FOREIGN PATENT DOCUMENTS

| | | |
|---|---|---|
| CA | 2009689 C | 4/2001 |
| DE | 1191770 B | 4/1965 |

(Continued)

OTHER PUBLICATIONS

International Search Report and Written Opinion for International Application No. PCT/EP2017/063571 dated Jul. 27, 2017 (8 pages).

*Primary Examiner* — John J Figueroa
(74) *Attorney, Agent, or Firm* — Fitch, Even, Tabin & Flannery LLP

(57) ABSTRACT

The invention relates to an emulsion containing or consisting of
(A) 40.00 to 97.98 wt. % of at least one hydrocarbon,
(B) 2.00 to 59.98 wt. % of water or an aqueous solution of a salt which does not fall under the following definition according to (C) and
(C) 0.02 to 8.00 wt. % of a salt of an amino amide of a fatty acid, containing at least one primary, secondary or tertiary amino group, and an acid component of general formula (I)

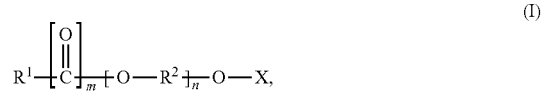

in which
R¹ is a linear or branched, saturated or mono-unsaturated or poly-unsaturated hydrocarbon radical with 1 to 40 C atoms,
R² is an alkylene radical or arylalkylene radical with 2 to 20 C atoms and
X is a radical which contains at least one acid group,
m=0 or 1,
n=1 to 30,
wherein the weight proportions of components (A), (B) and (C) relate to the sum of the masses of these components and this is 100 wt. %. The invention also relates to a method for the production of the emulsion, to an oil-based drilling mud and to a method for creating and stabilizing a drill hole.

17 Claims, No Drawings

(56) References Cited

U.S. PATENT DOCUMENTS

| | | | | |
|---|---|---|---|---|
| 3,728,277 A | * | 4/1973 | Foley | A61K 8/4946 |
| | | | | 516/27 |
| 4,108,779 A | * | 8/1978 | Carney | B01F 17/0085 |
| | | | | 507/108 |
| 4,140,640 A | * | 2/1979 | Scherubel | C09K 8/72 |
| | | | | 166/307 |
| 4,544,756 A | | 10/1985 | Patel | |
| 5,254,531 A | * | 10/1993 | Mueller | C09K 8/36 |
| | | | | 507/129 |
| 5,330,662 A | | 7/1994 | Jahnke et al. | |
| 2012/0186880 A1 | | 7/2012 | Patel | |

FOREIGN PATENT DOCUMENTS

| | | |
|---|---|---|
| EP | 0382070 A1 | 8/1990 |
| WO | 8911516 A1 | 11/1989 |

* cited by examiner

EMULSION, METHOD FOR THE PRODUCTION THEREOF AND USE THEREOF

The present invention relates to emulsions, to a method for the production thereof, to the use thereof and to a method for creating and stabilizing a drill hole using the emulsion.

An emulsion is a finely distributed mixture of two liquids which normally cannot be mixed. Emulsions are thermodynamically unstable. To stabilize the fine distribution, boundary-surface-active substances are used, namely so-called compatibility promoters or emulsifiers (surfactants) without the emulsion disintegrating rapidly. The disintegration is also designated as breaking of the emulsion. The emulsifiers prevent breaking of the emulsion and stabilize it at least for a limited time. The time until breaking of an emulsion may be between a few hours and a few years.

When producing an emulsion, for example from oil and water, small oil droplets may be formed, which are present, distributed in the aqueous phase. The phase which forms the droplets is designated as inner phase or disperse phase. The phase in which the droplets float is the outer phase or continuous phase.

The emulsion described here by way of example is a so-called oil-in-water emulsion.

Inter alia, depending on the volume proportions of oil and water, the water may also form the disperse phase and the oil the continuous phase. Such an emulsion is a water-in-oil emulsion.

The present invention relates to both oil-in-water emulsions and water-in-oil emulsions including so-called double-emulsions or multiple emulsions, that is, for example water-in-oil-in-water emulsions (W/O/W) or oil-in-water-in-oil emulsions (O/W/O).

Emulsions, for example water-in-oil emulsions are used, inter alia, in cosmetics, washing liquids, cleaning liquids and lubricants. A further important area of use is drilling sludges which are used when creating drill holes to recover petroleum and/or natural gas; these drilling sludges are also designated as drilling muds, and if the continuous phase is the oil phase, as oil-based drilling muds.

Since water firstly is cheaper than oil, and secondly ecologically safer, there is often considerable interest in introducing as much water as possible into oil-in-water emulsions and water-in-oil emulsions, for example into corresponding drilling sludges. Of course limits are placed on the maximum content of water, since the stability of the emulsion should be taken into account; in particular for water-in-oil emulsions this is from time to time a difficult task. The stability of such emulsions may advantageously be influenced by introducing suitable emulsifiers.

Drilling sludges, also called drilling muds, are pumped through the drill hole during drilling. They serve to stabilize a drill hole, clean the drill hole sole and to discharge the drilled-out land material. Furthermore, they cool and lubricate the drilling tool.

Although drilling muds based on water are also known which are much more economic and ecologically more advantageous than oil-containing drilling sludges, drilling sludges based on oil are advantageously used particularly when drilling very deep holes, because they show obvious working advantages. Typically the drilling sludges based on oil are emulsions of water in oil which often contain 5 to 40 volume % of an aqueous, dispersed salt phase. These emulsions comprise, inter alia, three compound types:

Emulsifiers for safeguarding the stability of the emulsion, rheology-control agents, for example organophilic clays to regulate the rheological properties and in particular the thixotropy and weighting agents, such as barium sulfate, to adjust the density of the fluid.

The U.S. Pat. No. 3,169,113 describes water-in-oil emulsions which are used when recovering oil and/or gas in special recovery methods. The emulsions contain, in addition to hydrocarbons, water and an inorganic acid, a $C_{9-18}$-monocarboxylic acid salt of a partial amide of a polyalkylene polyamine as emulsifier.

The U.S. Pat. No. 5,330,662 describes drilling sludges which contain a mixture of a salt solution and a liquid hydrocarbon. Combinations of surfactants and derivatives of succinyl acylating agents or hydroxyaromatic compounds are used as emulsifier. Solidified products with amines may be used as derivatives.

The U.S. Pat. No. 4,544,756 describes zwitterionic 2-alkylimidazolines as emulsifiers for drilling sludges based on oil.

Patent application EP 0 382 070 A1 describes the use of basic amine compounds capable of salt formation with carboxylic acids especially of oleophilic nature as an additive in W/O invert drilling oil sludges which contain ester oils in the closed oil phase for protection thereof against undesirable thickening in use and/or to improve flowability thereof.

U.S. Pat. No. 3,259,572 describes particularly advantageous emulsifiers for drilling mud solutions which are emulsions of water and oil which contain branched polyalkylene polyamines and derivatives thereof (such as for example alkoxylation products thereof) to stabilize just such emulsions.

It is the object of the present invention to indicate emulsions having at least one aqueous phase and at least one oil phase which have a high water content and at the same time high stability.

The emulsions of the invention should be suitable in particular as drilling sludges, but also for the production of cosmetics, washing agents and cleaning agents, liquids for metal processing, lubricants and as fuel additive in so-called water injection in internal combustion engines.

According to the invention, the afore-mentioned objects are achieved by an oil-in-water emulsion or a water-in-oil emulsion containing (A) 40 to 97.98 wt. % of at least one hydrocarbon, (B) 2 to 59.98 wt. % of water or an aqueous solution of a salt which does not fall under the following definition according to (C) and (C) 0.02 to 8.0 wt. % of a salt of an amino amide of a fatty acid, containing at least one primary, secondary or tertiary amino group, and an acid component of general formula (I)

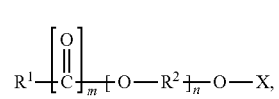

in which $R^1$ is a linear or branched, saturated or mono-unsaturated or poly-unsaturated hydrocarbon radical with 1 to 40 C atoms, $R^2$ is an alkylene radical or arylalkylene radical with 2 to 20 C atoms, which is the same or different in the n repeating units and contains maximum one ether oxygen atom and X is a radical which contains at least one acid group which is selected from carboxylic acid groups, phosphonic acid groups and phosphoric acid groups, m=0 or 1, n=1 to 30, wherein the weight proportions of components (A), (B) and (C) relate to the sum of the masses of these components and this is 100 wt. %.

The following disclaimers apply:

Excluded are emulsions which contain (a) less than 40 wt. % or more than 97.98 wt. % of a hydrocarbon and/or (b) less than 2 wt. % or more than 59.98 wt. % of water or an aqueous solution of a salt which does not fall under the definition according to (C) and/or (c) less than 0.02 or more than 8 wt. % of a salt according to (C), wherein the weight proportions of components (A), (B) and (C) relate to the sum of the masses of these components and this is 100 wt. %.

Nevertheless, the emulsions of the invention may contain further constituents in addition to components (A), (B) and (C), hence, for example insoluble inorganic particles (for example weighting agents or organically modified clay minerals). Furthermore, within the emulsion both the phase containing the hydrocarbon (A) and the phase containing water or the aqueous salt solution (B) may contain still further components soluble therein if this is advantageous or necessary due to the application. Hence, the hydrocarbon phase may contain, for example oil-soluble auxiliaries and/or the aqueous phase may contain, for example water-soluble alcohols (such as for example water-soluble glycols).

The emulsifier component (C) is thus a salt of an amino amide of a fatty acid as basic component and an acid component of general formula (I). Within the framework of the indicated structures, various acid and basic components may also be combined according to the invention to form a mixed salt as the emulsifier component.

In one embodiment of the invention, the composition containing (A), (B) and (C) may be an oil-in-water emulsion.

In a further embodiment of the invention, the composition containing (A), (B) and (C) may be a water-in-oil emulsion.

Both embodiments are suitable as constituents of the emulsion of the invention.

Advantageous designs of the invention can be seen from the dependent patent claims.

$R^1$ is advantageously an alkyl radical or alkenyl radical with 4 to 24 C atoms.

It is preferable if $R^1$ is an alkyl radical or alkenyl radical with 6 to 20 C atoms and m=0.

Particularly preferably $R^1$ is an alkyl radical or alkenyl radical with 8 to 20 C atoms and most particularly preferably an alkyl radical with 10 to 18 C atoms, wherein in each case m=0.

In a further advantageous embodiment, $R^1$ is derived from tall oil fatty acid and m=1 applies.

$R^2$ is advantageously an alkylene radical with 2 to 4 C atoms, which contains only carbon and hydrogen.

$R^2$ should advantageously contain maximum one ether oxygen.

Further advantageous designs may be described as follows:

$R^2$ represents an alkylene radical or arylalkylene radical with 2 to 9 C atoms and contains maximum one ether oxygen.

$R^2$ represents an alkylene radical —$CH_2CH_2$— and/or $CH_2$—$CH(CH_3)$—.

$R^2$ represents an alkylene radical with 2 to 4 C atoms and contains only carbon and hydrogen, wherein the molar proportion of repeating units where $R^2$=—$CH_2CH_2$— (relative to the totality of $R^2$ containing n units) is at least 40%, preferably at least 50%, particularly preferably at least 70%.

In a particularly advantageous design, $R^2$ represents in all n repeating units a radical —$CH_2$—$CH_2$—.

n is advantageously a whole number from 2 to 14, particularly preferably a whole number from 4 to 12.

The radical X advantageously contains carboxylic acid groups. Furthermore, it is preferred if only one acid group is present in the group X.

The radical X advantageously corresponds to general formula (II)

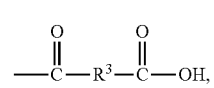

(II)

in which $R^3$ is a saturated or unsaturated divalent hydrocarbon radical, or the radical X corresponds to general formula (III)

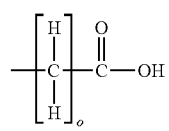

(III)

in which o=1 to 6.

Further preferred embodiments may be described as follows:

$R^3$ represents an alkyl radical or alkenyl radical with 2 to 12 C atoms.

$R^3$ represents an alkyl radical or alkenyl radical with 2 to 6 C atoms.

$R^3$ represents a group —$CH_2$—$CH_2$— or a group —CH=CH— or a phenylene group.

Advantageously o represents a whole number 1 or 2, o particularly preferably represents 1.

The acid component can be produced advantageously by reacting a preferably monofunctional fatty acid with a polyalkylene glycol in a molar ratio of 1:1 to form an intermediate product which has on average one hydroxyl group per molecule, and further reaction of the intermediate product with a dicarboxylic acid or a dicarboxylic acid anhydride to form an acid half-ester.

It is known to the expert that it may be advantageous for technical process control if reactions are not carried out according to the exact theoretical stoichiometric ratio, but one component is used in excess. This procedure is often used if it is necessary to ensure that the reactant shortfall used is reacted quantitatively and does not remain present in the reaction product as a contaminant. Hence, it is possible for example that the reaction of the fatty acid with the polyalkylene glycol takes place in a molar ratio which is not exactly 1.0:1.0, but lies for example between 0.8:1.0 and 1.2:1.0.

Methods for introducing terminal carboxylic acid groups into hydroxy-functional compounds by reacting OH groups thereof with cyclic carboxylic acid anhydrides are shown in *Polymer Bull.* (Berlin), 1980, 3, 347.

Preferred fatty acids are, for example tall oil fatty acid, oleic acid, tallow fatty acids (also in hydrogenated form), linoleic acid, linolenic acid, stearic acid, palmitic acid, capric acid, lauric acid, myristic acid, margaric acid, eicosanoic acid and behenic acid.

Further fatty acids mentioned by way of example are myristoleic acid, cis-6-hexadecenoic acid, linoleic acid, (9E, 12E)-octadeca-9,12-dienic acid, α-linolenic acid, docosahexanoic acid, abietinic acid, pimaric acid, caprylic acid, pelargonic acid, undecanoic acid, lauric acid, tridecanoic acid, pentadecanoic acid, stearic acid, nonadecanoic acid, arachic acid, heneicosanoic acid, tricosanoic acid, lignoceric acid, pentacosanoic acid, cerotinic acid, hexadecatrienoic acid, α-linolenic acid, rumelenic acid, stearidonic acid, α-parinarinic acid, β-parinarinic acid, eicosatrienoic acid, eicosa-tetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-elaeostearic acid, β-eleostearic acid, catalpinic acid, punicic acid, 10E,12Z-octadeca-9,11-dienoic acid, γ-linolenic acid, pinolenic acid, α-calendic acid acid, β-calendic acid acid, jacaric acid, eicosadienoic acid, dihomo-γ-linolenic acid, podocarpic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, palmitoleic acid, vaccenic acid, rumenic acid, cis-13-eicosenoic acid, 15-docosenoic acid, 17-tetracosenoic acid, elaidic acid, cis-11-eicosenoic acid, metic acid, erucic acid, nervonic acid, myristoleic acid.

Furthermore, the acid component can be produced advantageously by alkoxylation of a fatty alcohol and subsequent reaction of the OH groups of the intermediate product obtained with a reactant selected from the group comprising carboxyalkylation agents, phosphorylation agents and polycarboxylic acids or anhydrides thereof, preferably dicarboxylic acids or dicarboxylic acid anhydrides.

Examples of phosphorylation agents are phosphorus pentoxide, polyphosphoric acid or phosphorus oxychloride. Methods for introducing terminal carboxylic acid groups into hydroxy-functional compounds by reaction of OH groups thereof with cyclic carboxylic acid anhydrides and by carboxyalkylation are shown in *Polymer Bull.* (Berlin), 1980, 3, 347.

In a particularly advantageous embodiment, the acid component can be produced by carboxyalkylation of an alkoxylate of general formula (IV)

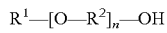 (IV)

(with R¹, R² and n as described previously) with an acid of general formula (V)

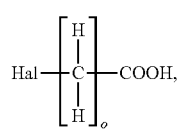 (V)

as alkylation agent or an ester of this acid as alkylation agent, wherein in the last-mentioned case, the ester protective group is cleaved again by ester hydrolysis after the alkylation reaction, so that again the free group COOH is formed; the radical Hal represents chlorine, bromine or iodine, the parameter o is defined as described previously.

In a further advantageous design, the acid component can be produced by alkoxylation of a fatty alcohol with ethylene oxide and/or propylene oxide and subsequent reaction of the OH groups of the intermediate product obtained with a reactant selected from the group comprising chloroacetic acid, phosphorus pentoxide, polyphosphoric acid, maleic anhydride and succinic anhydride.

The basic component is advantageously a fatty acid amino amide which can be produced by reacting a fatty acid with an aliphatic polyamine having at least 2 amino groups. An amine-like amino amide is thus recovered. The polyamine may optionally also additionally contain one or more OH groups. However, it is preferable if the polyamine consists only of carbon, hydrogen and nitrogen. Most particularly preferably the polyamine is a purely aliphatic polyamine.

Preferred fatty acids for the production of fatty acid amino amides are monofatty acids (as have also already been listed previously) and/or oligomerized fatty acids, which are accessible by dimerization or trimerization of unsaturated fatty acids (so-called dimer acids and trimer acids). The oligomerized fatty acids are preferably dimerization products and trimerization products of unsaturated fatty acids with 12 to 20 C atoms. The polyamino amides may also be produced by combined reaction of monofatty acids and oligomerized fatty acids with corresponding amines.

In a particularly preferred embodiment, exclusively monofatty acids are used for the production of fatty acid amino amides, preferably those with 10 to 24, particularly preferably with 12 to 20, most particularly preferably with 16 to 18 C atoms. A particularly preferred fatty acid for the production of amido amines is tall oil fatty acid.

Preferred amines for the reaction are linear and branched polyalkylene amines, for example ethylene amines such as ethylene diamine, diethylene triamine, triethylene tetraamine, tetraethylene pentaamine and propylene amines, such as 1,2-propylene diamine and 1,3-propylene diamine, dipropylene triamine and tripropylene tetraamine and also polyethylene amines, which may be regarded as branched polymers of aziridine. For example aminoethylethanol amine may be mentioned as OH-functional polyamine.

Particularly preferred fatty acid amino amides are accessible by reacting C16 monocarboxylic acids to C18 monocarboxylic acids with amines selected from the group comprising diethylene triamine, triethylene tetraamine and dipropylene triamine.

It is known that certain polyamines may also react with carboxylic acid groups with formation of cyclic nitrogen-containing structures. Such cyclized amino structures are also included according to the invention. For example polyamines may react with an ethylene diamine segment with formation of a five-membered ring (imidazoline), whereas those with a propylene diamine segment may react to form a six-membered ring (tetrahydropyrimidine).

In one particular embodiment, the oil-in-water emulsion or water-in-oil emulsion of the invention contains
(A) 65 to 94.9 wt. % of at least one hydrocarbon,
(B) 4.9 to 35 wt. % of water or an aqueous salt solution and
(C) 0.1 to 6 wt. % of a salt of an amino amide of a fatty acid and an acid component of formula (I), wherein the weight proportions of components (A), (B) and (C) relate to the sum of the masses of these components and this is 100 wt. %.

The proportions of components (A), (B) and (C) including preferred ranges may be summarized as follows:

| (A) wt. % | (B) wt. % | (C) wt. % |
|---|---|---|
| 40-97.98 | 2-59.98 | 0.02-8 |
| 50-96.96 | 3-49.96 | 0.04-6 |
| 65-94.9 | 4.9-34.9 | 0.1-5 |
| 69.5-89.5 | 10-30 | 0.5-4.5 |

The oil-in-water emulsion or water-in-oil emulsion of the invention advantageously contains
(A) 69.5 to 89.5 wt. % of at least one hydrocarbon,
(B) 10 to 30 wt. % of water or an aqueous salt solution and
(C) 0.5 to 5 wt. % of a salt of an amino amide of a fatty acid and an acid component of formula (I), wherein the weight proportions of components (A), (B) and (C) relate to the sum of the masses of these components and this is 100 wt. %.

In practice applications exist in which, depending on the field of application, it may be advantageous to introduce a rather high or a rather low content of water into the emulsion.

In general a high water content is advantageous. It offers the following advantages:
more cost-effective formulation
toxicologically advantageous (many mineral oils are questionable in terms of health, for example diesel oil)
ecologically advantageous; hence in oil drilling and gas drilling there are in some fields of application (offshore area), for example also legal parameters, that the drill cuttings may only be disposed of into the sea if the oil content of the material does not exceed a certain maximum
the filtration properties of the emulsion may be improved, for example in order to remove solid particles (for example drill cuttings within the framework of the drilling process) more easily
In particular for oil drilling, water (for example from a chalk layer) comes into contact with clay layers during drilling. The clay then starts to swell, which reduces the stability of the hole. The salt solution in the oil liquid absorbs this water so that the clay does not swell. The more salt load is facilitated (that is, considerable aqueous phase with as high as possible a salt content), the more water may be absorbed by osmotic pressure.
Improvement of employment protection and safety: From a certain water content of the emulsion (typically >30%) it can no longer be ignited.

However, there are also cases in which a lower water content is advantageous.
If further properties of the non-aqueous phase A play a part in the action profile of the total formulation (for example lubricating effect, hydrophobing, other surface phenomena; calorific value, for example in internal combustion engines), the technically useful maximum quantity of aqueous phase B may also be limited here by the application even if a higher water proportion could be realized by the use of suitable emulsifiers.
Certain drilling sludges exist (so-called "relaxed invert emulsion muds"), in which the water content, inter alia, is lower than for standard drilling sludges. With respect to the latter, "relaxed invert emulsion muds" are characterized in that they facilitate more rapid drilling speed, are less susceptible to contaminants and can be used stably at higher temperatures (see for this K. van Dyke, "*Drilling Fluids*", Fifth Impression 2012, Austin/USA, ISBN 0-88698-189-1).
For higher-boiling hydrocarbons (that is, boiling point of the hydrocarbon lies significantly above that of water) the following applies: at high temperatures (>100° C., at atmospheric pressure) undesirable behavior may occur due to vaporization/evaporation of water, in particular if the water proportion is particularly high
Within the framework of oil recovery, often higher temperatures and at the same time high pressure occur. Many emulsions thus then become, inter alia, unstable—particularly at high water content; good emulsifiers may generally stabilize emulsions, but due to temperature stress, a upper limit of usability is given here with regard to the quantity of the water phase.
Furthermore, cases exist in which it is desirable and advantageous to be able to variably set the water content:
Applications also exist in which it is desirable to flexibly set the water content in a low, average or high range. Use is thus made, for example of the fact that at high water proportions, the emulsified water droplets may behave similarly to a "solid" and therefore may increase viscosity or gel strength of the liquid. The viscosity of the overall system may thus be adjusted, for example also in correcting manner, in that the water content is increased or lowered without other (in some cases more costly) methods of viscosity regulation having to be used.

In a preferred procedure, the emulsion of the invention is produced in that the hydrocarbon according to (A) is initially placed, then the salt according to (C) is added and finally, after addition of the aqueous phase according to (B), homogenization is effected with application of shear energy.

In a further preferred procedure, the emulsion of the invention is produced in that the aqueous phase according to (B) is initially placed, then the salt according to (C) is added and finally, after addition of the hydrocarbon according to (A), homogenization is effected with application of shear energy.

In a particularly preferred procedure, the emulsion of the invention is produced in that the hydrocarbon according to (A) and the aqueous phase according to (B) are initially placed and then the salt according to (C) is added and homogenization is effected with application of shear energy.

The addition of optional further components apart from those according to (A), (B) and (C) may be effected optionally at the points in time of the production process of the emulsion which are advantageous depending on application.

The hydrocarbon component (A) consists of one or more aliphatic, aromatic or araliphatic hydrocarbons. They may be of natural origin (for example recovered from petroleum and processing products thereof) or may be produced fully synthetically. An example of this is diesel oil (recovered from petroleum fractions) or synthetic paraffins and synthetic internal olefins. In addition to hydrocarbons derived from petroleum, they may also be those from regenerative sources, that is, they may be of vegetable or animal origin.

Component (B) is either pure water or an aqueous solution of one or more salts. The aqueous salt solution contains as salts advantageously halides, carbonates, sulfates, phosphates, formates, acetates, citrates, lactates, malates, tartrates and/or hydroxides of at least one alkali metal or alkaline earth metal, of an element of the third main group or sub-group metal.

Preferred salts are the salts of alkali metals and alkaline earth metals and of zinc. Particularly preferred are the main groups 1 and 2, wherein most particularly preferred are Li, Na, K, Cs, Mg and Ca. The preferred salts are halides, carbonates, sulfates, phosphates, formates, hydroxides, wherein the halides are particularly preferred and the chlorides, iodides and bromides are most particularly preferred.

A typical concentration of the salt in the aqueous solution lies between 0 and 40 wt. %, preferably 5 to 35 wt. %, particularly preferably 10 to 30 wt. % and most particularly preferably 15 to 25 wt. %.

The present invention also relates to a method for the production of an oil-in-water emulsion or water-in-oil emulsion, in which an aqueous component (B) and at least one hydrocarbon (A) are homogenized in the presence of a salt (C) with application of shear energy.

The invention also relates to a drilling sludge which contains the above-mentioned components (A), (B) and (C) and additionally at least one further component which is selected from the group of rheology-control agents, fillers, inorganic thixotropic agents, weighting agents, wetting auxiliaries, crack-remedying agents, corrosion-protection agents and additives for setting an alkaline medium.

Finally, the invention also relates to a method for creating and stabilizing a drill hole for the preparation and/or carrying out of recovery of petroleum and/or natural gas, in which an emulsion of the invention or a drilling sludge according to the invention is used.

EXAMPLES

Production of Additives Suitable as Compatibility Promoters
Raw Materials Used

| Name | Description | Manufacturer |
| --- | --- | --- |
| Shellsol A | Aromatic hydrocarbon mixture | Overlack AG |
| Xylol | Xylene isomeric mixture | Overlack AG |
| DETA | Diethylene triamine [Bis(2-aminoethyl)amine] | Merck KGaA |
| Polyimin 300 | Epomin SP-003 | Nippon Shokubai Co., Ltd. |

Polyethers Used

| Name | Description[1] |
| --- | --- |
| Polyether 1 | propoxylated n-butanol, 18 WE PO |
| Polyether 2 | ethoxylated C13/15 alcohol, 11 WE EO |
| Polyether 3 | ethoxylated C13/15 alcohol, 5 WE EO |
| Polyether 4 | alkoxylated n-butanol (ethylene oxide/propylene oxide = 1:1), in each case 12 WE EO and PO |
| Polyether 5 | propoxylated stearyl alcohol, 5 WE PO |
| Polyether 6 | propoxylated C10-C14 fatty alcohol, 5 WE PO |
| Polyether 7 | ethoxylated methanol, 11 WE EO |
| Polyether 8 | ethoxylated C10 alcohol, 9 WE EO |
| Polyether 9 | ethoxylated isodecanol, 5 WE EO |

[1]WE: averaged number of repeating units; EO: Ethylene oxide; PO: Propylene oxide.

Analysis Methods

Structural explanation was carried out by means of NMR spectroscopy.
Production of the Acid Components
Acid A1:

In a reaction vessel with stirrer, high-efficiency condenser and nitrogen inlet, 372.9 g (0.267 mole) of polyether 1, 26.1 g of maleic anhydride (0.267 mole, Merck) and 0.8 g of 2,6-di-tert-butyl-para-cresol and 0.2 g of potassium carbonate are weighed out. Then the mixture is heated at 80° C. and the temperature maintained for 4 hours and afterwards the excess potassium carbonate is filtered off. A clear, yellow-orange colored, viscous product is obtained.

Acid A2:

In a three-necked flask with stirrer, reflux condenser and gas inlet, under nitrogen flow 1414.06 g of polyether 2 and 200.23 g of maleic anhydride and 0.73 g of potassium carbonate are heated at 80° C. and stirred for 4 hours at this temperature. Subsequently the potassium carbonate is separated off by filtration. A clear, slightly yellowish product is obtained which becomes partly solidified and cloudy overnight.

Acid A3:

In a reaction vessel with stirrer, high-efficiency condenser and nitrogen inlet, 164.4 g of polyether 3, 35.6 g of succinic anhydride and 0.2 g of potassium carbonate are weighed out. Then the mixture is heated at 80° C. and the temperature maintained for 4 hours and afterwards the excess potassium carbonate is filtered off. A clear, colorless, viscous product is obtained.

Acid A4:
Stage 1:

In a reaction vessel with stirrer, high-efficiency condenser, water separator and nitrogen inlet, 357.6 g (1.24 moles) of tall oil fatty acid and 251.2 g of polyethylene glycol 200 (1.24 moles) are weighed out. Then the mixture is heated at 120° C. and the temperature is then increased gradually to 215° C. in the course of 150 minutes. The mixture is kept at this temperature for 210 minutes and water is thus continuously distilled off. In total 17.1 g of water are distilled off (0.95 mole). A clear, yellow and liquid product is obtained.

Stage 2:

In a reaction vessel with stirrer, high-efficiency condenser and nitrogen inlet, 157.9 g (0.334 mole) of the hydroxy-functional ester from stage 1, 32.7 g of maleic anhydride (0.334 mole, Merck) and 0.04 g of para-toluenesulfonic acid are weighed out. Then the mixture is heated at 100° C. and the temperature maintained for 3 hours. A clear, yellow-orange colored, viscous product is obtained.

Acid A5:

In a reaction vessel with stirrer, high-efficiency condenser and nitrogen inlet, 371.7 g (0.280 mole) of polyether 4, 27.4 g of maleic anhydride (0.280 mole, Merck) and 0.8 g of 2,6-di-tert.-butyl-para cresol and 0.2 g of potassium carbonate are weighed out. Then the mixture is heated at 80° C. and the temperature maintained for 4 hours and afterwards the excess potassium carbonate is filtered off. A clear, yellow, viscous product is obtained.

Acid A6:

In a reaction vessel with stirrer, high-efficiency condenser and nitrogen inlet, 336.2 g (0.641 mole) of polyether 5, 62.9 g of maleic anhydride (0.641 mole, Merck) and 0.8 g of 2,6-di-tert.-butyl-para cresol and 0.2 g of potassium carbonate are weighed out. Then the mixture is heated at 80° C. and the temperature maintained for 6 hours and afterwards the excess potassium carbonate is filtered off. A clear, yellow, viscous product is obtained.

Acid A7:

In a reaction vessel with stirrer, high-efficiency condenser and nitrogen inlet, 329.4 g (0.711 mole) of polyether 6, 69.7 g of maleic anhydride (0.711 mole, Merck) and 0.8 g of 2,6-di-tert.-butyl-para cresol and 0.2 g of potassium carbonate are weighed out. Then the mixture is heated at 80° C. and the temperature maintained for 6 hours and afterwards the excess potassium carbonate is filtered off. A clear, yellow, viscous product is obtained.

Acid A8:
Ethoxylated octanol (8 WE EO) was carboxymethylated with chloroacetic acid.

Acid A9:
An alkoxylated alcohol mixture (C6 alcohol with 3 WE EO and C8 alcohol with 8 WE EO) was carboxymethylated with chloroacetic acid.

Acid A10:
An alkoxylated C16 alcohol (9 WE EO, 6 WE PO) was carboxymethylated with chloroacetic acid.

Acid A11:
An ethoxylated C16/C18 alcohol mixture (partly C18-unsaturated, 10.5 WE EO) was carboxymethylated with chloroacetic acid.

Acid A12:
An ethoxylated C12/C14 alcohol mixture (10 WE EO) was carboxymethylated with chloroacetic acid.

Acid A13:
An ethoxylated C16/C18 alcohol mixture (unsaturated, 5 WE EO) was carboxymethylated with chloroacetic acid.

Acid A14:
An ethoxylated C16/C18 alcohol mixture (unsaturated, 9 WE EO) was carboxymethylated with chloroacetic acid.

Acid A15:
Ethoxylated isotridecyl alcohol (8 WE EO) was phosphorylated with phosphorus pentoxide.

Acid A16:
In a reaction vessel with stirrer, high-efficiency condenser and nitrogen inlet, 332.9 g (0.675 mole) of polyether 7, 66.2 g of maleic anhydride (0.675 mole, Merck) and 0.8 g of 2,6-di-tert.-butyl-para cresol and 0.2 g of potassium carbonate are weighed out. Then the mixture is heated at 80° C. and the temperature maintained for 4 hours and afterwards the excess potassium carbonate is filtered off. A clear, brown, liquid product is obtained.

Acid A17:
In a reaction vessel with stirrer, high-efficiency condenser and nitrogen inlet, 440.2 g (0.670 mole) of polyether 8, 65.7 g of maleic anhydride (0.670 mole, Merck) and 1.0 g of 2,6-di-tert.-butyl-para cresol and 0.2 g of potassium carbonate are weighed out. Then the mixture is heated at 80° C. and the temperature maintained for 5 hours and afterwards the excess potassium carbonate is filtered off. A clear, slightly lilac-colored, liquid product is obtained.

Acid A18:
In a reaction vessel with stirrer, high-efficiency condenser and nitrogen inlet, 345.3 g (0.48 mole) of polyether 2 are weighed out and fused at a temperature of 50° C. 54.7 g of polyphosphoric acid (0.16 mole, Merck) are added to this clear solution in the course of 10 minutes. Then the mixture is heated at 50° C. for 3 hours and afterwards once again stirred for 6 hours at 80° C. A cloudy, white, paste-like product is obtained.

Acid A19:
Analogously to production instruction A2, polyether 9 was reacted with maleic anhydride to form the acid half-ester.

Production of the Basic Components (Amino Amides)

Base B1:
In a reaction vessel with stirrer, high-efficiency condenser and nitrogen inlet, 503.9 g (0.883 mole) of dimer acid (Pripol 1006, Croda) are weighed out and heated at 85° C. 182.2 g (1.766 moles) of N,N'-dimethyl-1,3-diaminopropane are added dropwise to this solution slowly in the course of 2 hours. In the course of 7 hours the temperature was increased stepwise to 180° C. and meanwhile water was distilled off continuously. This temperature was maintained for a further 2 hours. A slightly milky, dark brown, highly viscous product is obtained.

Base B2:
In a reaction vessel with stirrer, high-efficiency condenser and nitrogen inlet, 158.3 g of Polyimin 300 are weighed out and heated at 80° C. 281.9 g of tall oil fatty acid are added dropwise slowly to this solution in the course of 3.5 hours. In the course of 7 hours the temperature was increased stepwise to 180° C. and meanwhile water was distilled off continuously. This temperature was maintained for 2 hours and afterwards the residual water was removed once again for 30 minutes at about 100 mbar. A clear, brown, highly viscous product is obtained.

Base B3:
260.7 g of tall oil fatty acid and 53.7 g of N,N-bis(2-aminoethyl)amine are reacted analogously to WO 89/11516; subsequently 9.4 g of water are added and the mixture is stirred for 2 hours at 80° C. A mixture of the diamide and of the monoamide is obtained in the molar ratio 1.8:1.

Base B4:
In a reaction vessel with stirrer, high-efficiency condenser, water separator and nitrogen inlet, 81.0 g of tall oil fatty acid are heated at 80° C. Then 29.0 g of (2-hydroxyethyl)ethylene diamine are added with stirring and heated at 130° C., while the reaction water is distilled off. After 3 hours, the temperature is increased to 170° C. and stirred once again for 4 hours at this temperature. The corresponding fatty acid imidazoline is obtained in the form of a clear, viscous, orange-colored liquid.

Base B5:
In a reaction vessel with stirrer, high-efficiency condenser and nitrogen inlet, 134 g (1.299 moles) of DETA and 150 g of Xylol are weighed out and heated at 80° C. 366 g (1.299 moles) of tall oil fatty acid are added dropwise to this solution slowly in the course of 3 hours. In the course of 8 hours the temperature was increased stepwise to 180° C. and meanwhile water and Xylol were distilled off continuously. This temperature was maintained for 4 hours and afterwards the remaining Xylol was removed once again for 40 minutes at about 50 mbar. A clear, brown, liquid product is obtained. The product contains the imidazoline almost exclusively.

Base B6:
In a reaction vessel with stirrer, high-efficiency condenser and nitrogen inlet, 103 g (1.41 moles) of 1,3-diaminopropane and 150 g of Xylol (isomeric mixture) are weighed out and heated at 80° C. 397 g (1.41 moles) of tall oil fatty acid are added dropwise to this solution slowly in the course of 4.5 hours. In the course of 8 hours the temperature was increased stepwise to 180° C. and meanwhile water and Xylol were distilled off continuously. This temperature was maintained for 4 hours and afterwards the remaining Xylol was removed once again for 1 hour at about 40 mbar. A cloudy, brown, creamy paste-like product is obtained. The product contains the imidazoline almost exclusively.

Base B7:
In a reaction vessel with stirrer, high-efficiency condenser and nitrogen inlet, 285.3 g (0.82 mole) of the amino-functional imidazoline B5 and 19.7 g of water (1.09 moles, deionized) are weighed out and heated at 80° C. This temperature was maintained for 2 hours and afterwards stirred once again for 4 hours at 90° C. A cloudy, brown, creamy paste-like product is obtained. Ring opening of the imidazoline was thus effected quantitatively.

Base B8:
In a reaction vessel with stirrer, high-efficiency condenser and nitrogen inlet, 283.9 g (0.89 mole) of imidazoline B6 and 16.1 g of water (0.89 mole, deionized) are weighed out and heated at 80° C. This temperature was for 2 hours. A cloudy, light brown, creamy paste-like product is obtained. Ring opening of the imidazoline was thus effected quantitatively.

Production of Compatibility Promoters by Salting

Example C1

In a reaction vessel with stirrer, high-efficiency condenser, dropping funnel and nitrogen inlet, 190.3 g (0.205 mole) of acid A2 are weighed out and heated at about 80° C. Then 9.7 g of polyiminoamide B2 (0.205 mole of amine) are added. To complete the reaction, the solution is stirred for 2 hours at 80° C. A clear, orange-colored, viscous product is obtained which partly solidifies within a day.

Example C2

In a reaction vessel with stirrer, high-efficiency condenser, dropping funnel and nitrogen inlet, 39.5 g (0.173 mole) of imidazoline B5 are weighed out and heated at about 70° C. Then 160.5 g of acid A2 (0.173 mole) are added dropwise in the course of 15 minutes. To complete the reaction, the solution is stirred for 2 hours at 80° C. A clear, red-brown, viscous product is obtained which partly solidifies within a day.

Example C3

In a reaction vessel with stirrer, high-efficiency condenser, dropping funnel and nitrogen inlet, 90.7 g (0.18 mole) of amino-functional amide B3 are weighed out and heated at about 60° C. Then 109.3 g of acid A3 (0.18 mole) are added dropwise in the course of 5 minutes. To complete the reaction, the solution is stirred for 2 hours at 80° C. A clear, dark brown, highly viscous product is obtained.

Example C4

In a reaction vessel with stirrer, high-efficiency condenser, dropping funnel and nitrogen inlet, 90.4 g (0.179 mole) of amino-functional amide B3 are weighed out and heated at about 60° C. Then 109.6 g of acid A3 (0.179 mole) are added dropwise in the course of 5 minutes. To complete the reaction, the solution is stirred for 2 hours at 80° C. A clear, dark brown, highly viscous product is obtained.

Example C5

In a reaction vessel with stirrer, high-efficiency condenser, dropping funnel and nitrogen inlet, 70.6 g (0.14 mole) of amino-functional amide B3 are weighed out and heated at about 60° C. Then 129.4 g of acid A2 (0.14 mole) are added dropwise in the course of 5 minutes. To complete the reaction, the solution is stirred for 2 hours at 80° C. A clear, dark brown, highly viscous product is obtained which solidifies to form a paste-like product within a day.

Example C6

In a reaction vessel with stirrer, high-efficiency condenser, dropping funnel and nitrogen inlet, 53.1 g (0.094 mole) of acid A4 are weighed out and heated at about 80° C. Then 36.7 g of base B4 (0.094 mole) are added dropwise in the course of 5 minutes. To complete the reaction, the solution is stirred for 2 hours at 80° C. A clear, dark brown, highly viscous product is obtained.

Example C7

In a reaction vessel with stirrer, high-efficiency condenser, dropping funnel and nitrogen inlet, 37.3 g of amide B3 are weighed out and heated at about 80° C. Then 63.8 g of acid A4 are added dropwise in the course of 15 minutes. To complete the reaction, the solution is stirred for 2 hours at 80° C. A brown, viscous liquid is obtained.

Example C8

In a reaction vessel with stirrer, high-efficiency condenser, dropping funnel and nitrogen inlet, 92.1 g (0.182 mole) of amino-functional amide B3 are weighed out and heated at about 60° C. Then 107.9 g of acid A7 (0.182 mole) are added dropwise in the course of 10 minutes. To complete the reaction, the solution is stirred for 2 hours at 80° C. A clear, dark brown, highly viscous product is obtained.

Example C9

In a reaction vessel with stirrer, high-efficiency condenser, dropping funnel and nitrogen inlet, 91.7 g (0.181 mole) of amino-functional amide B3 are weighed out and heated at about 60° C. Then 108.3 g of acid A7 (0.181 mole) are added dropwise in the course of 10 minutes. To complete the reaction, the solution is stirred for 2 hours at 80° C. A cloudy, dark brown, highly viscous product is obtained.

Example C10

In a reaction vessel with stirrer, high-efficiency condenser, dropping funnel and nitrogen inlet, 40.9 g (0.081 mole) of amino-functional amide B3 are weighed out and heated at about 60° C. Then 121.4 g of acid A1 (0.081 mole) are added dropwise in the course of 10 minutes. To complete the reaction, the solution is stirred for 2 hours at 80° C. A cloudy, dark brown, highly viscous and partly solidified product is obtained.

Example C11

In a reaction vessel with stirrer, high-efficiency condenser, dropping funnel and nitrogen inlet, 44.6 g (0.088 mole) of amino-functional amide B3 are weighed out and heated at about 60° C. Then 134.2 g of acid A5 (0.088 mole) are added dropwise in the course of 10 minutes. To complete the reaction, 76.6 g of Shellsol A are added and the solution is stirred for 2 hours at 80° C. A clear, dark brown, liquid product is obtained, the active substance content of which lies at 70%.

Example C12

In a reaction vessel with stirrer, high-efficiency condenser, dropping funnel and nitrogen inlet, 62.3 g (0.131 mole) of amino-functional amide B3 are weighed out and heated at about 70° C. Then 87.7 g of acid A8 (0.131 mole) are added dropwise in the course of 15 minutes. To complete the reaction, the solution is stirred for 2 hours at 80° C. A cloudy, dark brown, highly viscous and partly solidified product is obtained.

Example C13

In a reaction vessel with stirrer, high-efficiency condenser, dropping funnel and nitrogen inlet, 69.4 g (0.146 mole) of amino-functional amide B3 are weighed out and heated at about 70° C. Then 79.1 g of acid A9 (0.146 mole) are added dropwise in the course of 15 minutes. To complete the reaction, the solution is stirred for 2 hours at 80° C. A clear, dark brown, highly viscous product is obtained.

Example C14

In a reaction vessel with stirrer, high-efficiency condenser, dropping funnel and nitrogen inlet, 43.0 g (0.090 mole) of amino-functional amide B3 are weighed out and heated at about 70° C. Then 110.5 g of acid A10 (0.090 mole) are added dropwise in the course of 15 minutes. To complete the reaction, the solution is stirred for 2 hours at 80° C. A cloudy, dark brown, highly viscous and partly solidified product is obtained.

Example C15

In a reaction vessel with stirrer, high-efficiency condenser, dropping funnel and nitrogen inlet, 46.3 g (0.097 mole) of amino-functional amide B3 are weighed out and heated at about 70° C. Then 101.7 g of acid A11 (0.097 mole) are added dropwise in the course of 15 minutes. To complete the reaction, the solution is stirred for 2 hours at 80° C. A milky-cloudy, dark brown, highly viscous product is obtained.

Example C16

In a reaction vessel with stirrer, high-efficiency condenser, dropping funnel and nitrogen inlet, 58.7 g (0.123 mole) of amino-functional amide B3 are weighed out and heated at about 70° C. Then 87.3 g of acid A12 (0.123 mole) are added dropwise in the course of 15 minutes. To complete the reaction, the solution is stirred for 2 hours at 80° C. A cloudy, dark brown, highly viscous and partly solidified product is obtained.

Example C17

In a reaction vessel with stirrer, high-efficiency condenser, dropping funnel and nitrogen inlet, 62 g (0.130 mole) of amino-functional amide B3 are weighed out and heated at about 70° C. Then 94 g of acid A13 (0.130 mole) are added dropwise in the course of 15 minutes. To complete the reaction, the solution is stirred for 2 hours at 80° C. A cloudy, dark brown, highly viscous and partly solidified product is obtained.

Example C18

In a reaction vessel with stirrer, high-efficiency condenser, dropping funnel and nitrogen inlet, 59.8 g (0.125 mole) of amino-functional amide B3 are weighed out and heated at about 70° C. Then 107.2 g of acid A14 (0.125 mole) are added dropwise in the course of 15 minutes. To complete the reaction, the solution is stirred for 2 hours at 80° C. A cloudy, dark brown, highly viscous and partly solidified product is obtained.

Example C19

In a reaction vessel with stirrer, high-efficiency condenser, dropping funnel and nitrogen inlet, 93.2 g (0.195 mole) of amino-functional amide B3 are weighed out and heated at about 70° C. Then 106.9 g of acid A15 are added dropwise in the course of 20 minutes. To complete the reaction, the solution is stirred for 2 hours at 80° C. A cloudy, dark brown, highly viscous and partly solidified product is obtained.

Example C20

In a reaction vessel with stirrer, high-efficiency condenser, dropping funnel and nitrogen inlet, 59.3 g (0.260 mole) of imidazoline B5 are weighed out and heated at about 70° C. Then 140.7 g of acid A9 (0.260 mole) are added dropwise in the course of 15 minutes. To complete the reaction, the solution is stirred for 2 hours at 80° C. A clear, brown, highly viscous product is obtained.

Example C21

In a reaction vessel with stirrer, high-efficiency condenser, dropping funnel and nitrogen inlet, 38.5 g (0.174 mole) of amino-functional amide B7 are weighed out and heated at about 70° C. Then 161.5 g of acid A2 (0.174 mole) are added dropwise in the course of 15 minutes. To complete the reaction, the solution is stirred for 2 hours at 80° C. A clear, red-brown, viscous product is obtained which solidifies completely within a day.

Example C22

In a reaction vessel with stirrer, high-efficiency condenser, dropping funnel and nitrogen inlet, 58.0 g (0.263 mole) of amino-functional amide B7 are weighed out and heated at about 70° C. Then 142.0 g of acid A9 (0.263 mole) are added dropwise in the course of 15 minutes. To complete the reaction, the solution is stirred for 2 hours at 80° C. A clear, brown, viscous product is obtained which solidifies partly within a day.

Example C23

In a reaction vessel with stirrer, high-efficiency condenser, dropping funnel and nitrogen inlet, 50.0 g (0.10 mole) of imidazoline B6 are weighed out and heated at about 70° C. Then 92.6 g of acid A2 (0.10 mole) are added dropwise in the course of 15 minutes. To complete the reaction, the solution is stirred for 2 hours at 80° C. A cloudy, brown, creamy product is obtained which solidifies completely within a day.

Example C24

In a reaction vessel with stirrer, high-efficiency condenser, dropping funnel and nitrogen inlet, 61.1 g (0.122 mole) of imidazoline B6 are weighed out and heated at about 70° C. Then 66.0 g of acid A9 (0.122 mole) are added dropwise in the course of 15 minutes. To complete the reaction, the solution is stirred for 2 hours at 80° C. A cloudy, brown, creamy product is obtained which becomes partly solid within a day.

Example C25

In a reaction vessel with stirrer, high-efficiency condenser, dropping funnel and nitrogen inlet, 70.1 g (0.140 mole) of amino-functional amide B8 are weighed out and heated at about 70° C. Then 129.9 g of acid A2 (0.140 mole) are added dropwise in the course of 15 minutes. To complete the reaction, the solution is stirred for 2 hours at 80° C. A clear, brown, viscous product is obtained which becomes solid, cloudy and light brown within a day.

Example C26

In a reaction vessel with stirrer, high-efficiency condenser, dropping funnel and nitrogen inlet, 96.2 g (0.192 mole) of amino-functional amide B8 are weighed out and heated at about 70° C. Then 103.8 g of acid A9 (0.192 mole) are added dropwise in the course of 15 minutes. To complete the reaction, the solution is stirred for 2 hours at 80° C. A clear, brown, viscous product is obtained which becomes cloudy and highly viscous within a day.

Example C27

In a reaction vessel with stirrer, high-efficiency condenser, dropping funnel and nitrogen inlet, 42.5 g (0.058 mole) of amino-functional diamide B1 are weighed out and heated at about 60° C. Then 107.5 g of acid A2 (0.116 mole) are added dropwise in the course of 5 minutes. To complete the reaction, the solution is stirred for 2 hours at 80° C. A clear, brown, viscous product is obtained which becomes solid, cloudy and light brown within a day.

Example C28

In a reaction vessel with stirrer, high-efficiency condenser, dropping funnel and nitrogen inlet, 60.6 g (0.082 mole) of amino-functional diamide B1 are weighed out and heated at about 60° C. Then 89.4 g of acid A9 (0.164 mole) are added dropwise in the course of 5 minutes. To complete the reaction, the solution is stirred for 2 hours at 80° C. A clear, brown, viscous product is obtained.

Example C29

In a reaction vessel with stirrer, high-efficiency condenser, dropping funnel and nitrogen inlet, 184.0 g (0.340 mole) of acid A9 are weighed out and heated at about 80° C. Then 16.0 g of polyaminoamide B2 (0.340 mole of amine) are added. To complete the reaction, the solution is stirred for 2 hours at 80° C. A clear, orange-colored, viscous product is obtained which solidifies partly within a day.

Example C30

In a reaction vessel with stirrer, high-efficiency condenser, dropping funnel and nitrogen inlet, 79.0 g (0.168 mole) of amino-functional amide B3 are weighed out and heated at about 80° C. Then 121.0 g of acid A17 (0.168 mole) are added dropwise in the course of 15 minutes. To complete the reaction, the solution is stirred for 2 hours at 80° C. A clear, dark brown, highly viscous product is obtained which solidifies partly within a day.

Example C31

In a reaction vessel with stirrer, high-efficiency condenser, dropping funnel and nitrogen inlet, 123.7 g (0.262 mole) of amino-functional amide B3 are weighed out and heated at about 80° C. Then 87.1 g of acid phosphoric acid ester A18 (0.262 mole) are added dropwise in the course of 15 minutes. To complete the reaction, the solution is stirred for 2 hours at 80° C. A clear, dark brown, highly viscous product is obtained which solidifies to form a cloudy and light brown material within a day.

Example C32

In a reaction vessel with stirrer, high-efficiency condenser, dropping funnel and nitrogen inlet, 87.4 g (0.173 mole) of amino-functional diamide B3 are weighed out and heated at about 60° C. Then 112.6 g of acid A6 (0.173 mole) are added dropwise in the course of 10 minutes. To complete the reaction, the solution is stirred for 2 hours at 80° C. A clear, dark brown, highly viscous product is obtained.

COMPARATIVE EXAMPLES (NOT ACCORDING TO THE INVENTION)

The following products have been used as comparative examples according to the state of the art:

Comparative Example V1

Propoxylated branched polyethylene imine having a molecular weight of 5,000 g/mole (according to the teaching of U.S. Pat. No. 3,259,572, claim 1, structural type (3): oxyalkylated branched polyalkylene polyamine), 50% strength dissolved in methoxypropanol, commercially available as Lupasol P0100 (BASF).

Comparative Example V2 (Analogously to Example XII from U.S. Pat. No. 3,169,113, Nalco)

Stage 1

In a reaction vessel with stirrer, high-efficiency condenser, water separator and nitrogen inlet, 349.3 g (1.24 moles) of tall oil fatty acid are weighed out and heated at 80° C. 50.7 g (0.31 mole) of triethylene tetramine are thus added dropwise in the course of 1 hour. The temperature was increased stepwise to 180° C. in the course of 6 hours wherein water was continuously distilled off. This temperature was maintained for a further 4 hours, the last hour under vacuum at 200 mbar. After cooling, a cloudy, light brown, paste-like product is obtained.

Subsequently in a reaction vessel with stirrer, high-efficiency condenser and nitrogen inlet, 105.2 g of the amide thus obtained are homogenized with 63 g of Xylol (isomeric mixture) at 60° C. for about 30 minutes. After cooling, a cloudy, light brown, paste-like product is obtained.

Stage 2:

In a reaction vessel with stirrer, high-efficiency condenser and nitrogen inlet, 115.3 g of the diester of triethanolamine are homogenized with 59.7 g of Xylol (isomeric mixture) at 60° C. for about 30 minutes. After cooling, a clear, yellow, liquid product is obtained.

Stage 3 (Product):

In a reaction vessel with stirrer, high-efficiency condenser and nitrogen inlet, 30 ml of the fused and dissolved amide from stage 1 are homogenized with 80 ml of the dissolved diester of triethanolamine from stage 2 at 60° C. for about 30 minutes. After cooling, a clear, light brown, liquid product is obtained.

Comparative Example V3

Corresponds to Example I from U.S. Pat. No. 2,946,746 (Union Oil Company of California).

Comparative Example V4

Corresponds to Example 1 from WO 89/11516 (Sandoz). In place of odorless kerosine, a Xylol isomeric mixture was used as solvent.

Comparative Example V5

Branched polyethylene imine having a molecular weight of 1,300 g/mole (according to the teachings of U.S. Pat. No. 3,259,572, claim 1, structural type (1): branched polyalkylene polyamines)

Comparative Example V6

Ethoxylated branched polyethylene imine having a molecular weight of 11,000 g/mole and an amine number of 47 (according to the teaching of U.S. Pat. No. 3,259,572, claim 1, structural type (3): oxyalkylated branched polyalkylene polyamines)

Application-Technology Testing of Additives Suitable as Compatibility Promoters

Raw Materials Used

| Name | Description | Manufacturer |
| --- | --- | --- |
| C1618 isomerized olefin | Synthetic olefin | Ineos Oligomers |
| Calcium chloride (anhydride) | | Sigma-Aldrich |
| Isopar H | Synthetic isoparaffin | Exxon Mobil Chemical |
| LVT 200 | Petroleum distillate | Deep South Chemical |
| XP-07 | Synthetic paraffin ("pure normal alkane mixture") | Halliburton-Baroid |
| Claytone 3 | Organophilic layered silicate | BYK-Chemie GmbH |
| Barite API 4.1 | Natural barium sulfate | Eurotech Int Sp. Z. (Mielec, Poland) |
| Sodium sulfate (anhydrous) | | VWR International |

A 25 wt. %-strength solution of $CaCl_2$ was produced by dissolving calcium chloride (anhydride) in demineralized water.

A 15 wt. %-strength solution of $Na_2SO_4$ was produced by dissolving sodium sulfate (anhydrous) in demineralized water.

Explanation of the Assessment Scale

Homogeneity
1 homogeneous
2 slightly inhomogeneous
3 inhomogeneous
4 strongly inhomogeneous
5 completely inhomogeneous Test System 1: Emulsion Consisting of a Synthetic Olefin and Aqueous Calcium Chloride Solution To produce the emulsion, 107.3 g of C1618-isomerized olefin are initially placed in an 800 ml stainless steel beaker. After addition of 8.2 g of the respective emulsifier, the sample is homogenized for 5 minutes using a Hamilton Beach Mixer (Type GM20/Model HMD 200-CE) at Stage 1. After addition of 84.5 g of the calcium chloride solution (25% strength in water), further homogenization is effected for 10 minutes at Stage 1.

After production, 120 g of the emulsion produced are placed in a 150 ml screw-top glass and stored at room temperature for 14 days.

Afterwards assessment of the emulsion is effected. Separation in % relative to the total filling height in the glass is thus determined. At the same time visual assessment of the homogeneity of the emulsion is effected according to the above-indicated assessment scale. The lower the separation in % and the lower the assessment number of homogeneity is, the better the emulsifying property of the respective compatibility promoter.

Formulation of the Emulsion:

| | |
| --- | --- |
| C1618 Isomer. Olefin | 107.3 g |
| Emulsifier | 8.2 g |
| 5 minutes Hamilton Beach Mixer Stage 1 | |
| Calcium chloride solution | 84.5 g |
| 10 minutes Hamilton Beach Mixer Stage 1 | |
| | 200.0 g |

Results

| Product | Separation % | Homogeneity |
| --- | --- | --- |
| Zero sample without emulsifier | 86 | 5 |
| Comparison V4 | 53 | 4 |
| Comparison V2 | 35 | 3-4 |
| Comparison V5 | 33 | 5 |
| Example C5 | 0 | 1 |
| Example C7 | 19 | 3 |
| Example C10 | 10 | 2 |
| Example C12 | 7 | 2 |
| Example C13 | 3 | 2 |
| Example C15 | 5 | 2 |
| Example C16 | 11 | 2 |
| Example C2 | 10 | 2 |
| Example C20 | 6 | 2 |
| Example C21 | 9 | 2 |
| Example C22 | 6 | 2 |
| Example C23 | 9 | 2 |
| Example C24 | 4 | 2 |
| Example C25 | 9 | 2 |
| Example C26 | 6 | 2 |

It can be seen in the table that in the presence of the compatibility promoters of the invention, significantly better stabilization of the emulsion is achieved than in the absence of an emulsifier or when using the comparative examples not according to the invention. The compatibility promoters of the invention thus show significantly improved application properties.

Test System 2: Emulsion Consisting of a Synthetic Isoparaffin (Isopar H) and Aqueous Calcium Chloride Solution To produce the emulsion, 107.3 g of Isopar H are initially placed in an 800 ml stainless steel beaker. After addition of 8.2 g of the respective emulsifier, the sample is homogenized for 5 minutes using a Hamilton Beach Mixer (Type GM20/Model HMD 200-CE) at Stage 1. After addition of 84.5 g of the calcium chloride solution (25% strength in water), further homogenization is effected for 10 minutes at Stage 1.

After production, 120 g of the emulsion produced are placed in a 150 ml screw-top glass and stored at room temperature for 14 days.

Afterwards assessment of the emulsion is effected analogously to the method described in test system 1.

Formulation of the Emulsion:

| | |
|---|---|
| Isopar H | 107.3 g |
| Emulsifier | 8.2 g |
| 5 minutes Hamilton Beach Mixer Stage 1 | |
| Calcium chloride solution | 84.5 g |
| 10 minutes Hamilton Beach Mixer Stage 1 | |
| | 200.0 g |

Results

| Product | Separation % | Homogeneity |
|---|---|---|
| Zero sample without emulsifier | 86 | 5 |
| Comparison V4 | 57 | 4 |
| Comparison V3 | 40 | 4 |
| Comparison V2 | 54 | 4 |
| Example C13 | 9 | 2 |
| Example C20 | 3 | 2 |
| Example C22 | 3 | 2 |
| Example C23 | 7 | 2 |
| Example C24 | 0 | 1 |
| Example C25 | 4 | 2 |
| Example C26 | 30 | 3-4 |

It can be seen in the table that in the presence of the compatibility promoters of the invention, significantly better stabilization of the emulsion is achieved than in the absence of an emulsifier or when using comparative examples V2, V3 and V4. The compatibility promoters of the invention thus show significantly improved application properties.

Test System 3: Emulsion Consisting of a Petroleum Distillate (LVT 200) and Aqueous Calcium Chloride Solution To produce the emulsion, 107.3 g of LVT 200 are initially placed in an 800 ml stainless steel beaker. After addition of 8.2 g of the respective emulsifier, the sample is homogenized for 5 minutes using a Hamilton Beach Mixer (Type GM20/Model HMD 200-CE) at Stage 1. After addition of 84.5 g of the calcium chloride solution (25% strength in water), further homogenization is effected for 10 minutes at Stage 1.

After production, 120 g of the emulsion produced are placed in a 150 ml screw-top glass and stored at room temperature for 14 days.

Afterwards assessment of the emulsion is effected analogously to the method described in test system 1.

Formulation of the Emulsion:

| | |
|---|---|
| LVT 200 | 107.3 g |
| Emulsifier | 8.2 g |
| 5 minutes Hamilton Beach Mixer Stage 1 | |
| Calcium chloride solution | 84.5 g |
| 10 minutes Hamilton Beach Mixer Stage 1 | |
| | 200.0 g |

Results

| Product | Separation % | Homogeneity |
|---|---|---|
| Zero sample without emulsifier | 83 | 5 |
| Comparison V4 | 51 | 4 |
| Comparison V3 | 36 | 4 |
| Comparison V2 | 49 | 4 |
| Example C13 | 13 | 2 |
| Example C2 | 8 | 2 |
| Example C20 | 4 | 2 |
| Example C21 | 10 | 2 |
| Example C22 | 4 | 2 |
| Example C23 | 7 | 2 |
| Example C24 | 6 | 2 |
| Example C25 | 12 | 2 |
| Example C26 | 6 | 2 |

It can be seen in the table that in the presence of the compatibility promoters of the invention, significantly better stabilization of the emulsion is achieved than in the absence of an emulsifier or when using comparative examples V2, V3 and V4. The compatibility promoters of the invention thus show significantly improved application properties.

Test System 4: Emulsion Consisting of a Synthetic Paraffin Based on an N-Alkane Mixture (XP-07) and Aqueous Calcium Chloride Solution To produce the emulsion, 107.3 g of XP-07 are initially placed in an 800 ml stainless steel beaker. After addition of 8.2 g of the respective emulsifier, the sample is homogenized for 5 minutes using a Hamilton Beach Mixer (Type GM20/Model HMD 200-CE) at Stage 1. After addition of 84.5 g of the calcium chloride solution (25% strength in water), further homogenization is effected for 10 minutes at Stage 1.

After production, 120 g of the emulsion produced are placed in a 150 ml screw-top glass and stored at room temperature for 14 days.

Afterwards assessment of the emulsion is effected analogously to the method described in test system 1.

Formulation of the Emulsion:

| | |
|---|---|
| XP-07 | 107.3 g |
| Emulsifier | 8.2 g |
| 5 minutes Hamilton Beach Mixer Stage 1 | |
| Calcium chloride solution | 84.5 g |
| 10 minutes Hamilton Beach Mixer Stage 1 | |
| | 200.0 g |

Results

| Product | Separation % | Homogeneity |
|---|---|---|
| Zero sample without emulsifier | 84 | 5 |
| Comparison V4 | 57 | 5 |
| Comparison V3 | 34 | 5 |
| Comparison V2 | 56 | 5 |
| Example C13 | 10 | 2 |
| Example C20 | 3 | 2 |
| Example C22 | 3 | 2 |
| Example C26 | 18 | 3 |

It can be seen in the table that in the presence of the compatibility promoters of the invention, significantly better stabilization of the emulsion is achieved than in the absence of an emulsifier or when using comparative examples V2, V3 and V4. The compatibility promoters of the invention thus show significantly improved application properties.

Test System 5: Drilling Sludge Based on a Petroleum Distillate (LVT 200) and Aqueous Calcium Chloride Solution To produce the drilling sludge, 162.0 g of LVT 200 are initially placed in an 800 ml stainless steel beaker. Afterwards according to the formulation indicated below, the further constituents are added one after another and after each item homogenized for 5 minutes using a Hamilton Beach Mixer (Type GM20/Model HMD 200-CE) at Stage 1. The last item is the addition of Barite API 4.1 and afterwards homogenization for 10 minutes using a Hamilton Beach Mixer (Type GM20/Model HMD 200-CE) at Stage 1.

After production, the drilling sludge is placed in a 500 ml screw-top glass and the homgeneity of the drilling sludge is assessed directly visually.

Formulation of the Drilling Sludge:

| Raw material | Initial weight/g | Homogenization* |
|---|---|---|
| LVT 200 | 162.00 | |
| CLAYTONE 3 | 0.90 | 5 minutes |
| Calcium hydroxide | 2.65 | 5 minutes |
| Emulsifier | 8.80 | 5 minutes |
| Calcium chloride solution (25% strength) | 54.00 | 5 minutes |
| Barite API 4.1 | 271.65 | 10 minutes |
| Total | 500.00 | |

*Hamilton Beach Mixer Stage 1

Explanation of the Assessment Scale
Homogeneity
1 homogeneous
2 slightly inhomogeneous
3 inhomogeneous
4 strongly inhomogeneous
5 completely inhomogeneous
Results

| Product | Homogeneity |
|---|---|
| Zero sample without emulsifier | 5 |
| Comparison V1 | 5 |
| Comparison V5 | 5 |
| Comparison V6 | 5 |
| Example C1 | 1 |
| Example C12 | 1 |
| Example C13 | 1 |
| Example C2 | 1 |
| Example C31 | 1 |

It can be seen in the table that in the presence of the compatibility promoters of the invention, good stabilization of the emulsion in the drilling sludge is achieved. In the absence of an emulsifier or when using the comparative examples, immediate coagulation of the barium sulfate was effected so that the drilling sludge technically can no longer be used. The compatibility promoters of the invention are thus significantly better suited for the production and stabilization of a drilling sludge than the comparative examples.

Test System 6: Drilling Sludge Based on a Petroleum Distillate (LVT 200) and Aqueous Calcium Chloride Solution To produce the drilling sludge, 194.4 g of LVT 200 are initially placed in an 800 ml stainless steel beaker. Afterwards according to the formulation indicated below, the further constituents are added one after another and after each item homogenized for 5 minutes using a Hamilton Beach Mixer (Type GM20/Model HMD 200-CE) at Stage 1. The last item is the addition of Barite API 4.1 and afterwards homogenization for 10 minutes using a Hamilton Beach Mixer (Type GM20/Model HMD 200-CE) at Stage 1.

After production, the drilling sludge is placed in a 500 ml screw-top glass and the homgeneity of the drilling sludge is assessed directly visually.

Formulation of the Drilling Sludge:

| Raw material | Initial weight/g | Homogenization* |
|---|---|---|
| LVT 200 | 194.40 | |
| CLAYTONE 3 | 0.90 | 5 minutes |
| Calcium hydroxide | 2.65 | 5 minutes |
| Emulsifier | 8.80 | 5 minutes |
| Calcium chloride solution (25% strength) | 21.60 | 5 minutes |
| Barite API 4.1 | 271.65 | 10 minutes |
| Total | 500.00 | |

*Hamilton Beach Mixer Stage 1

Explanation of the Assessment Scale
Homogeneity
1 homogeneous
2 slightly inhomogeneous
3 inhomogeneous
4 strongly inhomogeneous
5 completely inhomogeneous
Results

| Product | Homogeneity |
|---|---|
| Zero sample without emulsifier | 5 |
| Comparison V1 | 5 |
| Comparison V5 | 5 |
| Example C12 | 1 |
| Example C13 | 1 |
| Example C2 | 1 |
| Example C31 | 1 |

It can be seen in the table that in the presence of the compatibility promoters of the invention, good stabilization of the emulsion in the drilling sludge is achieved. In the absence of an emulsifier or when using the comparative examples, immediate coagulation of the barium sulfate was effected so that the drilling sludge technically can no longer be used. The compatibility promoters of the invention are thus significantly better suited for the production and stabilization of a drilling sludge than the comparative examples.

Test System 7: Emulsion Consisting of a Petroleum Distillate (LVT 200) and Pure Water To produce the emulsion, 111.8 g of LVT 200 are initially placed in an 800 ml stainless steel beaker. After addition of 8.2 g of the respective emulsifier, the sample is homogenized for 5 minutes using a Hamilton Beach Mixer (Type GM20/Model HMD 200-CE) at Stage 1. After addition of 80.0 g of water, further homogenization is effected for 10 minutes at Stage 1.

After production, the emulsion produced is placed in a 250 ml screw-top glass and stored at room temperature overnight.

Afterwards assessment of the emulsion is effected analogously to the method described in test system 1.

Formulation of the Emulsion:

| LVT 200 | 111.8 g |
|---|---|
| Emulsifier | 8.2 g |
| 5 minutes Hamilton Beach Mixer Stage 1 | |
| Demineralized water | 80.0 g |
| 10 minutes Hamilton Beach Mixer Stage 1 | |
| | 200.0 g |

Results

| Product | Separation % | Homogeneity |
|---|---|---|
| Zero sample without emulsifier | 81 | 5 |
| Comparison V4 | 49 | 4 |
| Comparison V2 | 56 | 3-4 |
| Example C20 | 12 | 2 |
| Example C22 | 6 | 2 |
| Example C23 | 3 | 1-2 |

It can be seen in the table that in the presence of the compatibility promoters of the invention, significantly better stabilization of the emulsion is achieved than in the absence of an emulsifier or when using the comparative examples according to the state of the art. The compatibility promoters of the invention thus show to significantly better emulsifying properties.

Test System 8: Emulsion Consisting of a Petroleum Distillate (LVT 200) and Aqueous Sodium Sulfate Solution To produce the emulsion, 111.8 g of LVT 200 are initially placed in an 800 ml stainless steel beaker. After addition of 8.2 g of the respective emulsifier, the sample is homogenized for 5 minutes using a Hamilton Beach Mixer (Type GM20/Model HMD 200-CE) at Stage 1. After addition of 80.0 g of sodium sulfate solution (15% strength in water), further homogenization is effected for 10 minutes at Stage 1.

After production, the emulsion produced is placed in a 250 ml screw-top glass and stored at room temperature overnight.

Afterwards assessment of the emulsion is effected analogously to the method described in test system 1.

Formulation of the Emulsion:

| | |
|---|---|
| LVT 200 | 111.8 g |
| Emulsifier | 8.2 g |
| 5 minutes Hamilton Beach Mixer Stage 1 | |
| Sodium sulfate solution (15% strength) | 80.0 g |
| 10 minutes Hamilton Beach Mixer Stage 1 | |
| | 200.0 g |

Results

| Product | Separation % | Homogeneity |
|---|---|---|
| Zero sample without emulsifier | 81 | 5 |
| Comparison V4 | 54 | 3 |
| Comparison V2 | 40 | 3 |
| Example C20 | 3 | 1 |

It can be seen in the table that in the presence of the compatibility promoters of the invention, significantly better stabilization of the emulsion is achieved than in the absence of an emulsifier or when using the comparative examples according to the state of the art. The compatibility promoter of the invention thus shows significantly better emulsifying properties.

The invention claimed is:

1. An emulsion comprising:
   (A) 40.00 to 97.98 wt. % of at least one hydrocarbon,
   (B) 2.00 to 59.98 wt. % of water or an aqueous solution of a salt which does not fall under the following definition as claimed in (C) and
   (C) 0.02 to 8.00 wt. % of a salt, which is the reaction product of an amino amide of a fatty acid, containing at least one primary, secondary or tertiary amino group, and an acid component of general formula (I)

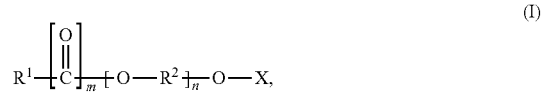

in which
R$^1$ is a linear or branched, saturated or mono-unsaturated or poly-unsaturated hydrocarbon radical with 1 to 40 C atoms,
R$^2$ is an alkylene radical or arylalkylene radical with 2 to 20 C atoms, which is the same or different in the n repeating units and contains maximum one ether oxygen atom and
X is a radical which contains at least one acid group which is selected from carboxylic acid groups, phosphonic acid groups and phosphoric acid groups,
m=0 or 1,
n=1 to 30,
wherein the weight proportions of components (A), (B) and (C) relate to the sum of the masses of these components and this is 100 wt. %.

2. The emulsion as claimed in claim 1, wherein R$^1$ is an alkyl radical or alkenyl radical with 4 to 24 C atoms.

3. The emulsion as claimed in claim 1, wherein R$^1$ is an alkyl radical or alkenyl radical with 6 to 20 C atoms and m=0.

4. The emulsion as claimed in claim 1, wherein R$^2$ is an alkylene radical with 2 to 4 C atoms and contains only carbon and hydrogen.

5. The emulsion as claimed in claim 1, wherein the radical X corresponds to general formula (II)

in which R$^3$ is a saturated or unsaturated divalent hydrocarbon radical, or the radical X corresponds to general formula (III)

in which o=1 to 6.

6. The emulsion as claimed in claim 5, wherein in general formula (II) R$^3$ represents a group selected from —CH$_2$—CH$_2$—, —CH=CH— and a phenylene group, or in general formula (III) o=1 or 2.

7. The emulsion as claimed in claim 1, wherein the acid component has been produced by reacting a fatty acid with a polyalkylene glycol in a molar ratio of 0.8:1 to 1.2:1 to form an intermediate product which has on average one hydroxyl group per molecule, and further reaction of the intermediate product with a dicarboxylic acid or a dicarboxylic acid anhydride to form an acid half-ester.

8. The emulsion as claimed in claim 1, wherein the acid component has been produced by alkoxylation of a fatty alcohol and subsequent reaction of the OH groups of the intermediate product obtained with a reactant selected from the group comprising carboxyalklating agents, phosphorylating agents and dicarboxylic acids or dicarboxylic acid anhydrides.

9. The emulsion as claimed in claim 1, wherein the acid component has been produced by alkoxylation of a fatty alcohol with ethylene oxide and/or propylene oxide and subsequent reaction of the OH groups of the intermediate product obtained with a reactant, wherein the reactant comprises at least one of chloroacetic acid, phosphorus pentoxide, polyphosphoric acid, maleic anhydride, succinic anhydride, or combination thereof.

10. The emulsion as claimed in claim 1, wherein the amide component is a fatty acid amino amide which can be produced by reacting a fatty acid with an aliphatic polyamine having at least 2 amino groups.

11. The emulsion as claimed in claim 1, it contains
(A) 69.50 to 89.50 wt. % of at least one hydrocarbon,
(B) 10.00 to 30.00 wt. % of water or an aqueous salt solution and
(C) 0.50 to 5.00 wt. % of a salt of an amino amide of a fatty acid and an acid component of formula (I), wherein the weight proportions of components (A), (B) and (C) relate to the sum of the masses of these components and this is 100 wt. %.

12. The emulsion as claimed in claim 1, wherein the at least one hydrocarbon comprises at least one hydrocarbon of synthetic, vegetable, animal or petrochemical origin.

13. The emulsion as claimed in claim 1, wherein the aqueous salt solution contains water and at least one of a halide, carbonate, sulfate, phosphate, formate, acetate, citrate, lactate, malate, tartrate, hydroxide of at least one alkali metal or alkaline earth metal or sub-group metal, or combination thereof.

14. A method for the production of an emulsion selected from the group of water-in-oil emulsions and oil-in-water emulsions as claimed in claim 1, the method comprising homogenizing an aqueous component (B) and at least one hydrocarbon (A) in the presence of a salt (C) with application of shear energy.

15. An oil-based drilling mud containing components (A), (B) and (C) as claimed in claim 1 and at least one of a rheology-control agent, filler, inorganic thixotropic agent, weighting agent, wetting auxiliarie, crack-remedying agent, corrosion-protection agent, additive for setting an alkaline medium, or combination thereof.

16. A method for creating and stabilizing a drill hole for the preparation and/or carrying out of recovery of petroleum and/or natural gas, the method comprising applying an emulsion as claimed in claim 1 to the drill hole.

17. A method for creating and stabilizing a drill hole for the preparation and/or carrying out of recovery of petroleum and/or natural gas, the method comprising applying an oil-based drilling mud as claimed in claim 15 to the drill hole.

* * * * *